(No Model.)

J. M. TURLEY.
COTTON AND CORN PLANTER.

No. 252,818. Patented Jan. 24, 1882.

WITNESSES:
Thos. Houghton.
Amos W. Hart

INVENTOR:
Jas. M. Turley
BY
ATTORNEYS.

UNITED STATES PATENT OFFICE.

JAMES M. TURLEY, OF ONION CREEK, TEXAS.

COTTON AND CORN PLANTER.

SPECIFICATION forming part of Letters Patent No. 252,818, dated January 24, 1882.

Application filed September 5, 1881. (No model.)

*To all whom it may concern:*

Be it known that I, JAMES M. TURLEY, of Onion Creek, in the county of Travis and State of Texas, have invented a new and useful Improvement in Cotton and Corn Planters; and I do hereby declare that the following is a full, clear, and exact description of the same.

My invention relates to an improvement in machines for planting cotton, corn, and other seeds, and for sake of economy it may be made an attachment of a cultivator-frame, (the cultivating devices proper being in such case detached,) although the machine may be made complete in itself.

The principal features of the invention are, first, reciprocating forked seed pushers or plungers attached to a sliding frame and operating alternately to deliver the seed through a covered opening in the bottom of the hopper, whence it passes into the furrow; second, an intermittently-rotating shaft arranged in the seed-hopper and provided with spiral or oblique arms for agitating the seed and feeding it toward the discharge-opening.

Figure 1:
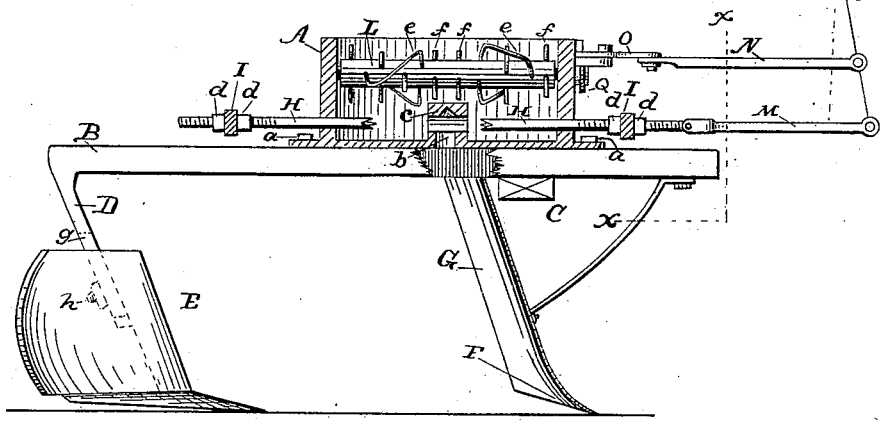
Figure 2:
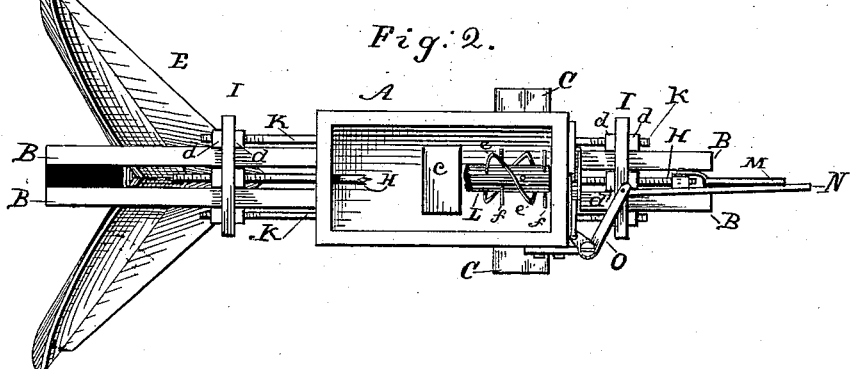
Figure 3:
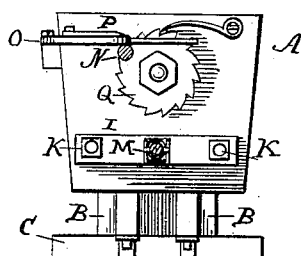
Figure 4:
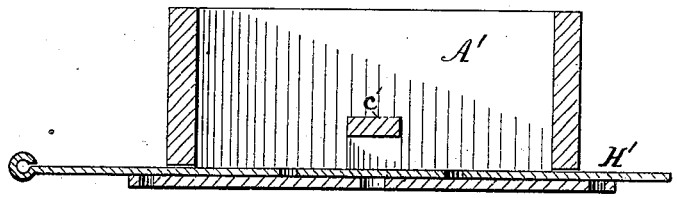

In accompanying drawings, forming part of this specification, Figure 1 is mainly a side view of the machine, a portion being in section. Fig. 2 is a plan view. Fig. 3 is a cross-section on line *x x* of Fig. 1. Fig. 4 is a longitudinal section of a seed-hopper of modified construction.

The machine embodying my invention is in practice attached to a cultivator-frame, from one of whose wheels the seed plungers and agitator derive motion, as hereinafter described.

The seed-hopper A is secured by screws *a* on a frame, B, composed of parallel beams, which are attached to a cross-bar, C, at its front end and united at their rear ends to form a suitable shank or standard, D, for attachment of the sweep or seed-coverer E.

The furrow-opening share F is attached to or formed on a hollow shank, G, attached to the under side of the frame or beams B. The seed discharges behind the shank G into the furrow through a hole, *b*, in the middle of the bottom of the hopper A. Said hole *b* is directly beneath a bridge or cut-off, *c*, which is raised or arched slightly above the bottom of the hopper.

The seed-ejecting devices consist of the forked rods or plungers H H, which are arranged to reciprocate horizontally and lengthwise of the hopper, near the bottom thereof, Fig. 1. The said plungers are arranged on opposite sides of the bridge *c* and work through holes in the opposite ends of the hopper. They are attached at their outer ends to straps or cross-bars I, which connect the ends of rods K. The straps I thus form the ends and the rods K the sides of a rectangular frame. The rods K slide in guides or guideways formed in the bottom of the hopper A. The inner ends of the plungers H H have forked or pronged ends to adapt them to take up and carry cotton-seed forward to the discharge-opening *b*. The frame I K is constantly reciprocated when the machine advances, and hence the plungers H have the same motion, so that one of them moves toward the opening *b* and pushes a quantity of seed beneath the bridge *c* as the other plunger is receding from it. The alternating movements of the plungers thereby produce an intermittent discharge of seed, which descends into the furrow by its own gravity. The plungers H pass through the straps I, and are secured by means of screw-nuts *d*, which allow their adjustment lengthwise, so that their forked ends may be brought nearer each other or separated more widely, as required to effect the discharge of seed in the desired manner.

The seed-agitator consists of a shaft, L, having spirally-curved arms *e* and radial arms *f*. Said shaft is journaled in the ends of the box or hopper A, and its arms sweep over the bottom of the hopper as the shaft is rotated intermittently, by means which I will presently describe. The radial arms *f* have no other function but to agitate the seed. The arms *e*, however, serve also as a means of feeding or pushing the seed toward the opening *b*, and thus assist in effecting its discharge. They are arranged in pairs, one pair on each side of the bridge *c*.

Each arm *e* is formed of a rod or bar whose ends are attached to the shaft L and its body or intermediate portion inclined at an angle of about forty-five degrees, so that when the shaft rotates to the left, Fig. 2, the arms *e* will crowd the seed from each end of the hopper toward its middle.

The means for reciprocating the seed-ejectors H and rotating agitator L e f are respectively the rods M and N, which are in practice jointed to a vibrating lever, y, which is arranged vertically and vibrates in a fixed fulcrum, z, its upper end being for the purpose connected with a crank rotated by suitable gear-connection with the axle or one of the wheels of the cultivator, to which the whole seeding attachment is secured.

The means of connection between the rod N and agitator L e f are an elbow-lever, O, a slotted link, P, and pawl-ratchet Q. The latter is fixed on the end of the agitator-shaft, and the link P engages it when moved in one direction, but slides over it in the other. The elbow-lever O is pivoted horizontally to a fixed bracket or arm and connects the link with rod N.

The frame B of the seeding attachment may be connected with a cultivator in various ways. For instance, it may be attached to the axle of a wheeled cultivator by means of a clamp which is adapted to fasten to the end of the beam B, or it may be attached by means of brace-rods extending diagonally outward from the end of the beam B or from the cross-bar C, and its forward ends bolted to the cultivator-frame.

The hopper A and plungers H are more particularly adapted for use in planting cotton-seed, and hence when corn is to be planted I detach such hopper A and its appendages and substitute another, A', (shown in Fig. 4,) which has a longitudinal recess in its bottom to receive a flat reciprocating perforated slide, H'.

The sweep or seed-coverer E, before mentioned, is a double-winged share, or one having two lateral mold-boards that incline rearwardly at about right angles to each other. The sweep is adjustable vertically on the standard D, which is provided with a slot, g, to receive a screw, h, that secures the sweep rigidly in place. The vertical adjustment of the sweep causes it to take more or less earth, so that it will accordingly cover the seed more or less deeply.

Both sweep and furrow-opener may be gaged to run at any desired depth by means of a chain (not shown) attached to the rear end of the beam B. The whole planting attachment may be raised and held clear of the ground by same lever and chains employed for hoisting the cultivator-plows. By planting cotton-seed in hills, as this machine is adapted to do, much time and labor are saved in subsequent cultivation of the crop, since the plants do not require to be chopped out to a stand, as usual when the seed is planted in drills.

The seed box or hopper is preferably constructed of iron for sake of strength and durability.

What I claim as new is—

1. The combination, with a seed-hopper, A, having a central discharge-opening, b, in its bottom, of the plungers H H, arranged in alignment with each other, and with a space between their inner ends, and reciprocating from one end to the center and from the center to the opposite end of the hopper alternately, substantially as described.

2. The combination, with a seed-hopper provided with a central discharge-opening, b, in its bottom, and a bridge, c, of the plungers H H, in alignment with each other, and provided with forked ends, with a space between them, and adapted to reciprocate from one end to the center and from the center to the opposite end of the hopper alternately, substantially as described.

3. The combination of horizontally-reciprocating plungers, H, having forked ends, and arranged in alignment as specified, the rigid frame I K, whose side bars work in guides, a seed box or hopper placed horizontal, and mechanism for connecting the plunger-frame with a transporting-wheel for reciprocating the plungers, substantially as shown and described.

4. In combination with the parallel side bars, K, and straps I for connecting them, the plungers H and nuts applied thereto, in the manner described, for adjustment of the plungers, as specified.

5. The combination of the two reciprocating and aligned plungers H, the hopper A, having discharge-opening b and bridge c, and the shaft L, having two sets of arms, e, which are arranged on opposite sides of said opening and inclined in opposite directions, as shown and described, so that the seed is pushed toward the opening when the plungers advance in that direction.

6. The shaft L, having inclined arms e, and means for imparting intermittent rotation to it, in combination with the hopper having a bottom discharge-opening and seed-ejecting devices, substantially as shown and described.

JAMES M. TURLEY.

Witnesses:
JOHN J. McCUISTION,
JOSEPH MARTIN.